(12) United States Patent
Franchi et al.

(10) Patent No.: US 6,545,241 B1
(45) Date of Patent: Apr. 8, 2003

(54) GAS-INSULATED SWITCHGEAR DEVICE

(75) Inventors: Claudio Franchi, Saronno (IT); Fabio Montelaghi, Bergamo (IT); Costante Piazza, Lodi (IT)

(73) Assignee: ABB Service S.r.l., Milan (IT)

( * ) Notice: Subject to any disclaimer, the term of this patent is extended or adjusted under 35 U.S.C. 154(b) by 0 days.

(21) Appl. No.: 09/807,423
(22) PCT Filed: Jan. 18, 1999
(86) PCT No.: PCT/EP99/07914
§ 371 (c)(1),
(2), (4) Date: May 22, 2001
(87) PCT Pub. No.: WO00/24099
PCT Pub. Date: Apr. 27, 2000

(30) Foreign Application Priority Data

Oct. 20, 1998 (IT) .......................................... MI98A2259

(51) Int. Cl.[7] .............................................. H01H 33/70
(52) U.S. Cl. ............................. 218/78; 218/154; 218/43
(58) Field of Search ............................. 218/43, 45, 48, 218/51–53, 46, 47 RO, 139–140, 151–154, 134, 78, 143

(56) References Cited

U.S. PATENT DOCUMENTS

| | | | | |
|---|---|---|---|---|
| 3,602,667 A | * | 8/1971 | Reichl et al. ................ | 218/156 |
| 3,769,478 A | * | 10/1973 | Weston et al. ................ | 218/12 |
| 4,211,902 A | * | 7/1980 | Tsuchida ...................... | 218/43 |
| 4,379,957 A | * | 4/1983 | Calvino ........................ | 218/2 |
| 5,350,892 A | * | 9/1994 | Rozier ......................... | 218/119 |
| 5,981,889 A | * | 11/1999 | Niklaus ....................... | 218/154 |

FOREIGN PATENT DOCUMENTS

| | | |
|---|---|---|
| DE | 89 12 889 | 2/1990 |
| DE | 298 06 654 | 7/1998 |

* cited by examiner

Primary Examiner—Elvin Enad
Assistant Examiner—M. Fishman
(74) Attorney, Agent, or Firm—Oblon, Spivak, McClelland, Maier & Neustadt, P.C.

(57) ABSTRACT

A high- and medium-voltage gas-insulated switchgear device having a casing. The casing includes an interruption unit having at least one fixed contact and one moving contact that can couple with each other, and a first actuator that is operatively connected to the moving contact. The casing also includes a disconnection unit electrically connected to the interruption unit. The disconnection unit has at least one fixed contact and one moving contact that can couple with each other, and a second actuator that is operatively connected to the moving contact. At least one of the actuators includes a motor with position control.

17 Claims, 9 Drawing Sheets

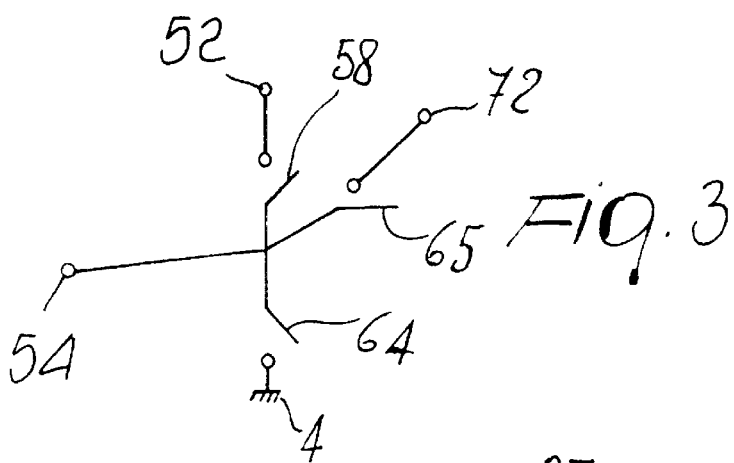
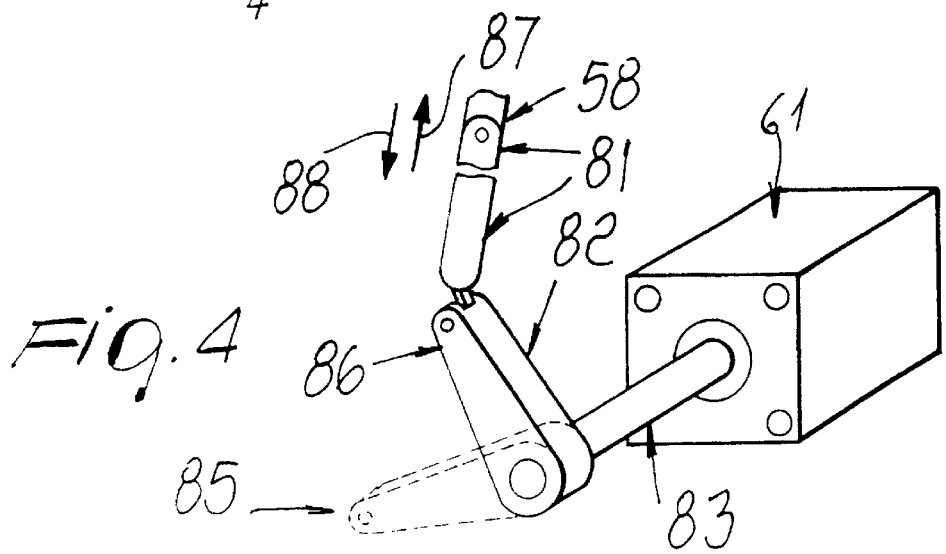
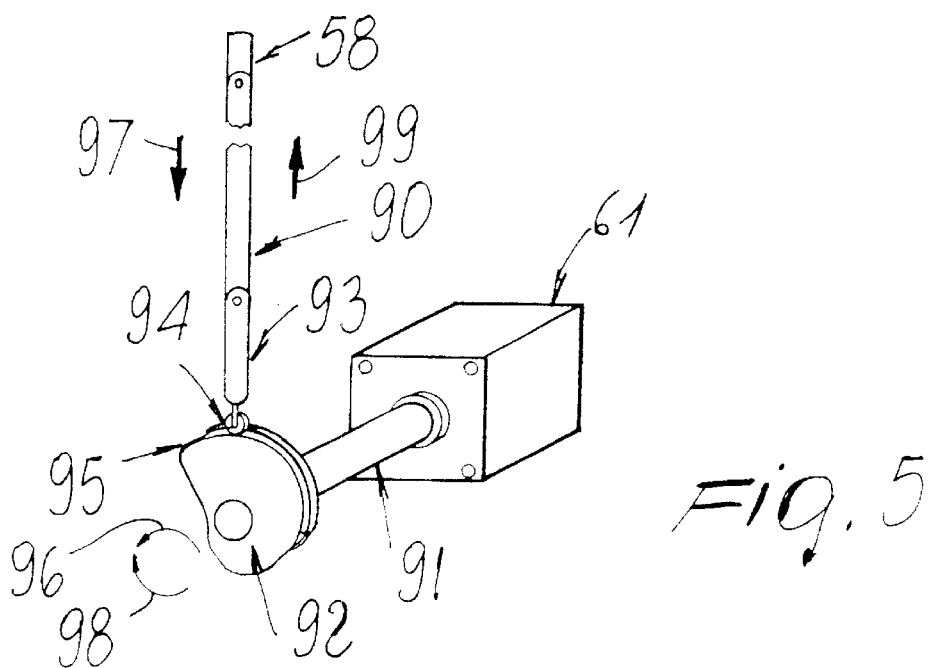

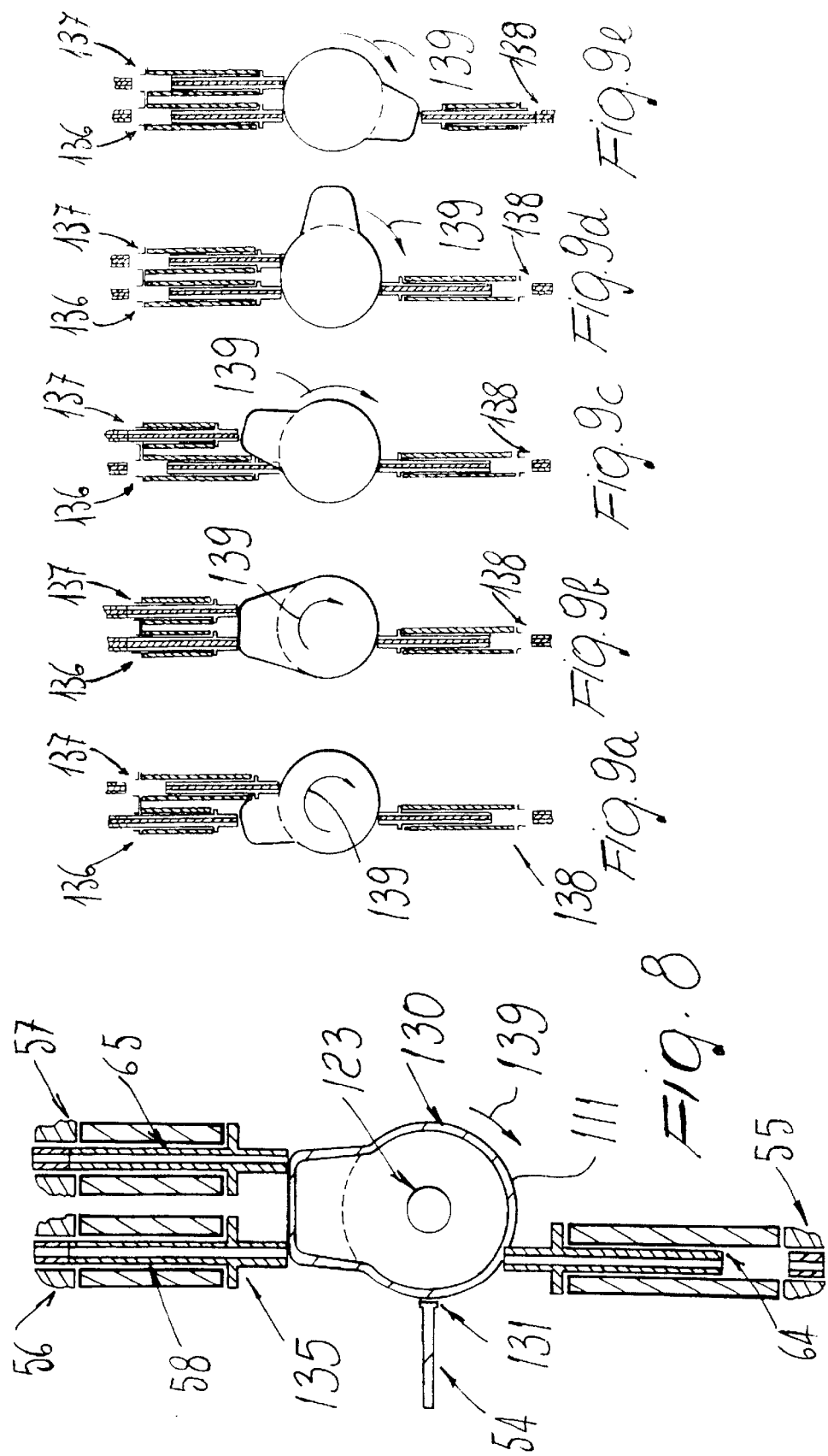

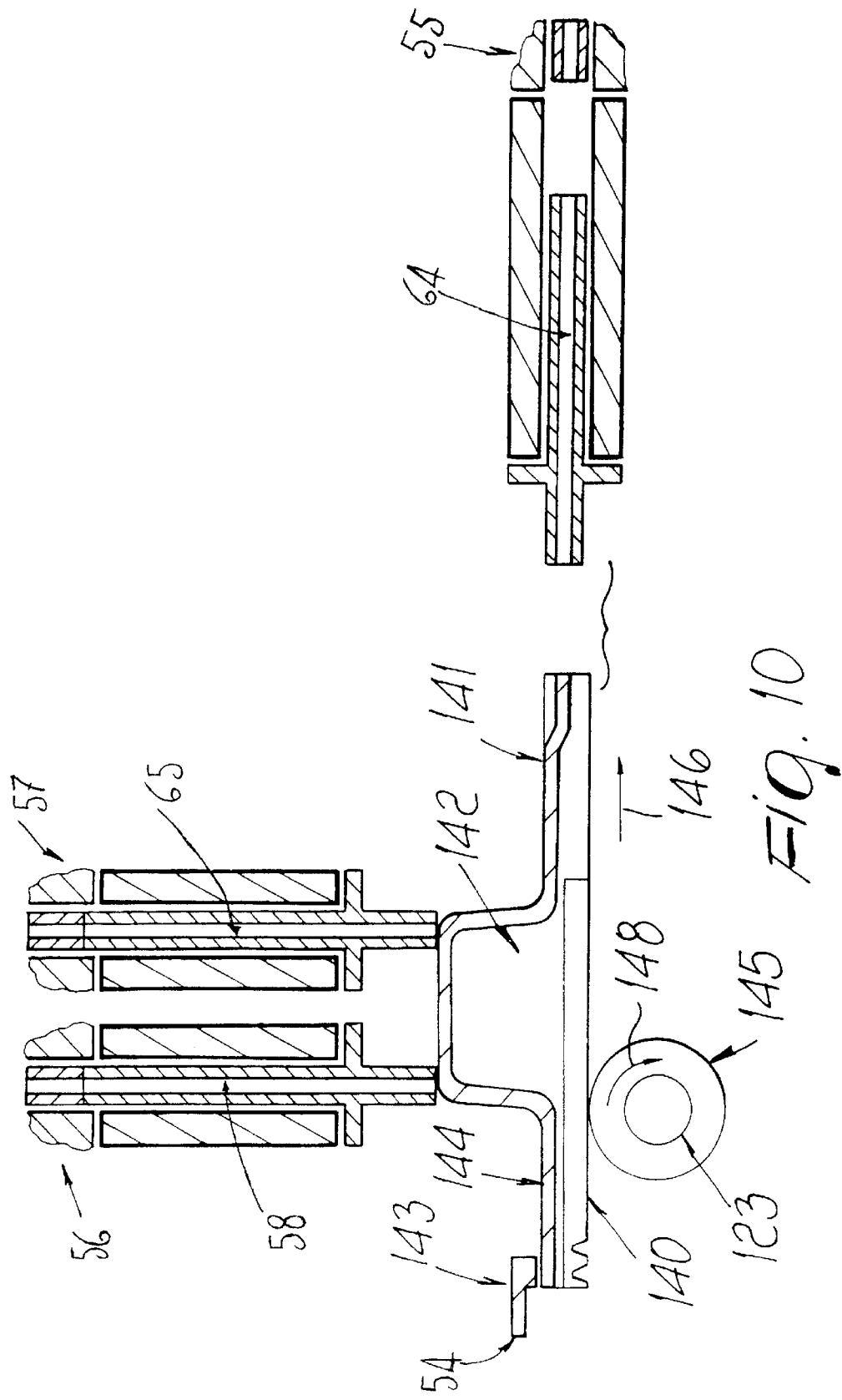

GAS-INSULATED SWITCHGEAR DEVICE

BACKGROUND OF THE INVENTION

The present invention relates to a high- and medium-voltage gas-insulated switchgear device, i.e. for voltages greater than 1000 Volt The device according to the present invention comprises a very simple and effective system for realizing both the interruption and disconnection operations.

It is known from the prior art that electrical operations, both for interruption and for disconnection, in high- and medium-voltage gas-insulated switchgear devices are performed by moving a moving contact. This is allowed by an actuation system for performing the electrical operation.

For interruption and disconnection operations, the actuation devices most frequently used in the conventional gas-insulated systems are of the mechanical or hydraulic type.

Mechanical actuation devices generally require complicated kinematic systems for transmitting the movement to the moving contact and complicated adjustment processes, because the rule of motion of the moving contact is determined exclusively by the mechanical characteristics of the involved structural elements and cannot be changed by the user, but is set at the design stage.

Because of the presence of complicated kinematic chains, the response time is relatively long. In order to achieve shorter response times it is necessary to provide much more energy than required to move the single movable mechanical element.

Moreover, said rule of motion can vary over time due to the wear of the single components, leading to a degradation in performance and therefore to the need to perform a large number of maintenance interventions in order to maintain the nominal behavior of the actuation system.

Hydraulic-type actuation devices partially solve these problems but have several drawbacks due to the presence of fluids and most of all to the sensitivity of said fluids to temperature variations.

Some conventional gas-insulated devices use, for the electrical operations, actuation and control systems which comprise electric motors which are manually actuated by an operator.

Even these actuation and control systems, despite fulfilling their task, are characterized, like the previously described ones, by lack of control over the rule of motion of the mechanical element that they move.

Lack of control over the rule of motion, both during the interruption operation and during the disconnection operation, requires the presence of stroke limiting devices in order to limit the movement of the moving contact and the presence of shock absorbers or dampers in order to dissipate the residual kinetic energy at the end of the operation.

Because of lack of control over the rule of motion, the positioning of the moving contact itself is inaccurate and can lead to early wear of the mechanical parts affected by the electrical operation.

Lack of control over the rule of motion during the interruption and disconnection operations makes it difficult to coordinate them correctly, this requires several interventions, with a considerable increase in the time required to complete the operation.

BRIEF SUMMARY OF THE INVENTION

Further drawbacks are also caused by the dynamic behavior of the actuation means, especially during interruption operations.

The aim of the present invention is to provide a high- and medium-voltage gas-insulated switchgear device, in which the actuation of the moving contact of the interruption and/or disconnection elements occurs according to a preset rule of motion.

Within the scope of this aim, an object of the present invention is to provide a high- and medium-voltage gas-insulated switchgear device which has a reduced mechanical complexity.

Another object of the present invention is to provide a high- and medium-voltage gas-insulated switchgear device in which the interruption and disconnection operations are executed in shorter times in relation to the known devices.

Another object of the present invention is to provide a high- and medium-voltage gas-insulated switchgear device in which repeatability of the interruption and/or disconnection operation is ensured, optionally compensating for variations caused by aging and wear.

A further object of the present invention is to provide a high- and medium-voltage gas-insulated switchgear device which is compact and has reduced dimensions.

A further object of the present invention is to provide a high- and medium-voltage gas-insulated switchgear device which is highly reliable, relatively easy to manufacture and at competitive costs.

This aim, these objects and others which will become better apparent hereinafter are achieved by a high- and medium-voltage gas-insulated switchgear device, characterized in that it comprises a casing which contains:

- at least an interruption unit having at least one fixed contact and one moving contact which can couple each other, and first actuation means which are operatively connected to the moving contact;
- at least a disconnection unit electrically connected to the interruption unit, said disconnection unit having at least one fixed contact and one moving contact which can couple each other, and second actuation means which are operatively connected to the moving contact;
- and in that at least one of said actuation means comprises a motor with position control.

The use of a motor with position control allows, among other things, to precisely apply a preset rule of motion during electrical operations.

Control of the rule of motion of the moving contact allows to ensure the accuracy and repeatability of the operation and its execution in a reduced time.

The use of a motor with position control allows a simplification of the overall mechanical structure of the device according to the invention, reducing the dimensions and increasing the reliability of the system.

The device according to the present invention can be of the segregated-phase or joined-phase type and of the single-pole or three-pole actuation type.

Further characteristics and advantages of the invention will become apparent from the description of preferred but not exclusive embodiments of a high- and medium-voltage gas-insulated switchgear device according to the invention, illustrated only by way of non-limitative example in the accompanying drawings, wherein:

BRIEF DESCRIPTION OF THE DRAWINGS

FIG. 3 is an electrical diagram of the disconnection operations that can be performed with the device of FIG. 2;

FIG. 4 is a schematic view of an embodiment of the actuation means utilised in the device of FIG. 2 for disconnection operations;

FIG. 5 is schematic view of another embodiment of the actuation means utilised in the device of FIG. 2 for disconnection operations;

FIG. 8 is a schematic view of an embodiment of an actuation system utilised in the gas-insulated device of FIG. 7;

FIGS. 9a–9e are schematic views of the disconnection operations that can be performed with the actuation system of FIG. 8;

FIG. 10 is a schematic view of another embodiment of an actuation system utilised in the gas-insulated device of FIG. 7;

DETAILED DESCRIPTION OF THE INVENTION

In the following description, with the same reference number will be indicated technically equivalent elements.

Figure 1:
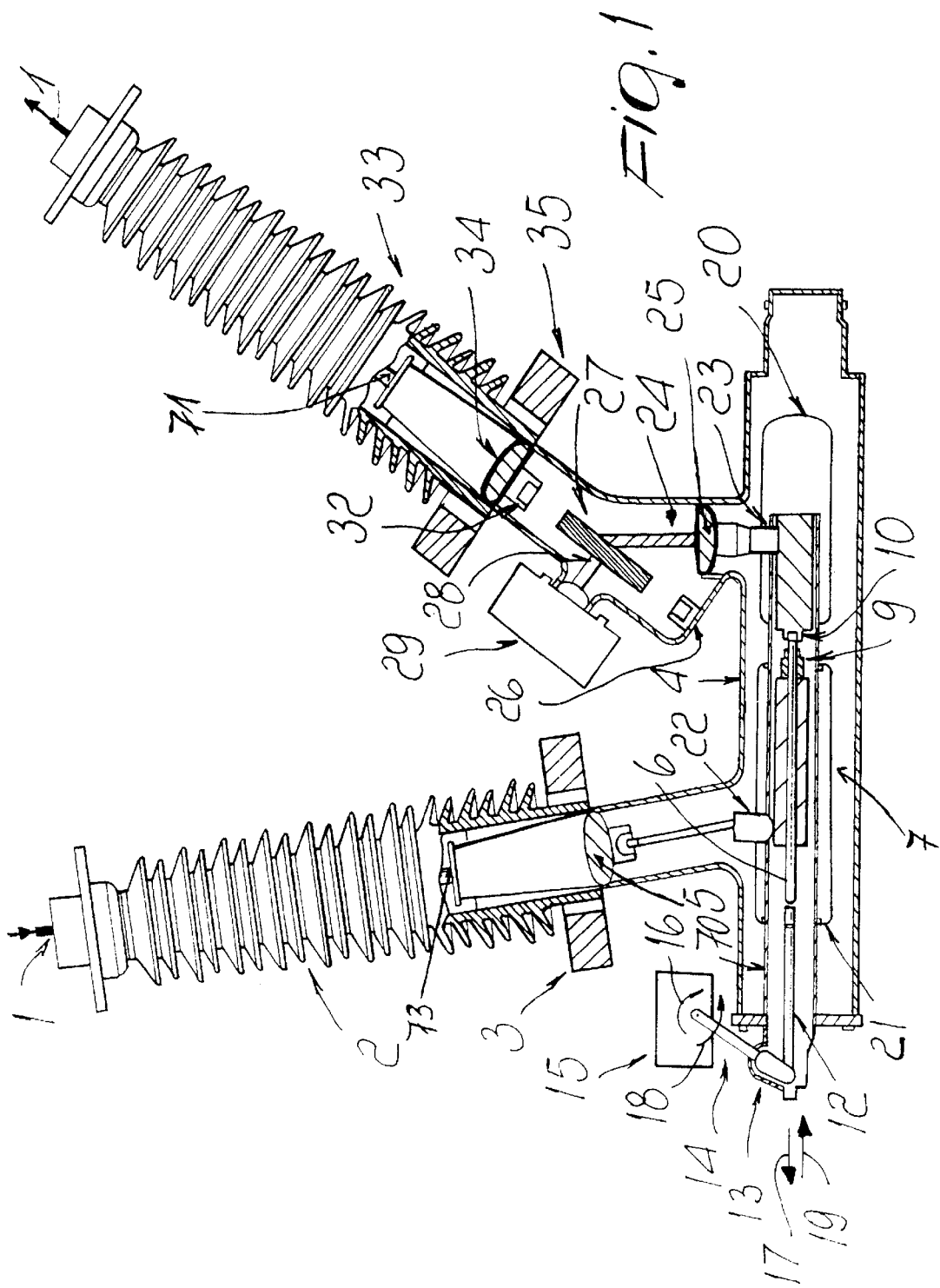
FIG. 1 is a view of an embodiment of a high- and medium-voltage gas-insulated switchgear device according to the present invention for a single-bar system.

With reference to FIG. 1, the high- and medium-voltage gas-insulated switchgear device according to the invention, comprises a gas-insulated casing 4 which contains an interruption unit 7, and a disconnection unit 24. A first bushing 2 and a second bushing 33 are structurally connected to the casing 4 and house a first electrical terminal 73 and a second electrical terminal 71, respectively; seal can be ensured by a partition 5. As schematically illustrated, a main power line 1 can be connected in input to the device with the terminal 73 and in output from the device with the terminal 71. A transformer 3 is arranged at the base of the bushing 2 in order to measure the line current in input to the interruption unit 7.

The interruption unit 7 is electrically connected to the terminal 73 by means of the connection 22 and comprises a moving contact 9 and a fixed contact 10 which can couple/uncouple each other; the moving contact 9 is operatively connected to actuation means, in particular to a guiding rod 6 which is in turn operatively connected to an actuation and control system 15.

In the embodiment of FIG. 1, the actuation and control system 15 is constituted by a rotary motor with position control, e.g. a motor provided with a position sensor. Preferably, a rotary servomotor with a position sensor is used. The use of a servomotor allows to have an accurate control over the rule of motion of the moving contact and to have considerable power available with reduced delivery times. Further, for an equal power level it is possible to act with two independent control parameters (torque and/or speed), allowing higher flexibility during design.

The connection between the motor 15 and the moving contact 9 occurs by means of a kinematic pair capable of converting the rotary motion of the driving shaft 14 into a translatory motion of the moving contact 9. As illustrated in FIG. 1, in a preferred embodiment, the kinematic pair comprises a crank 13 rigidly coupled to the shaft 14 which is connected to the servomotor, and a connecting rod 12 which is connected to the crank 13 and to the guiding rod 6 of the moving contact 9.

During the opening operation, the servomotor 15 turns the shaft 14 in the direction of the arrow 16, causing the movement of the connecting rod 12 and therefore of the actuation rod 6 in the direction of the arrow 17. The moving contact 9, guided by the guiding rod 6, therefore separates from the fixed contact 10. During the closure operation, the servomotor 15 drives the shaft 14 in the direction of the arrow 18, accordingly producing the movement of the moving contact 9 in the direction of the arrow 19.

Preferably, the connecting rod 12, the guiding rod 6, the moving contact 9 and the fixed contact 10 are arranged inside the chamber 70 of the unit 7 which is made of insulating material, for example fiberglass-reinforced plastics, and is sealed with respect to the rest of the volume of the casing 4. The chamber 70 is surrounded by field shields 20 and 21 and can be extracted with respect to the rest part of the device in the direction of the arrow 17. This solution is advantageous since it allows complete replacement of the unit 7 if the parts subject to greatest wear, i.e. the moving contact 9 and the fixed contact 10, are damaged, considerably facilitating the maintenance of the device.

Furthermore, if the interruption unit 7 is sealed, the gas-insulated device is filled with an insulating gas in the volume that is not occupied by the unit 7 (for example mixtures of nitrogen and $SF_6$ or pure nitrogen or air) and with gas having a high arc quenching power (for example $SF_6$) inside the chamber 7. In this way, it is possible to optimize the use of dielectric fluids and to reduce the environmental impact; in fact, the dielectric fluids which have a high environmental impact are used only in the sealed interruption unit where a high arc quenching power is required.

Figure 6:
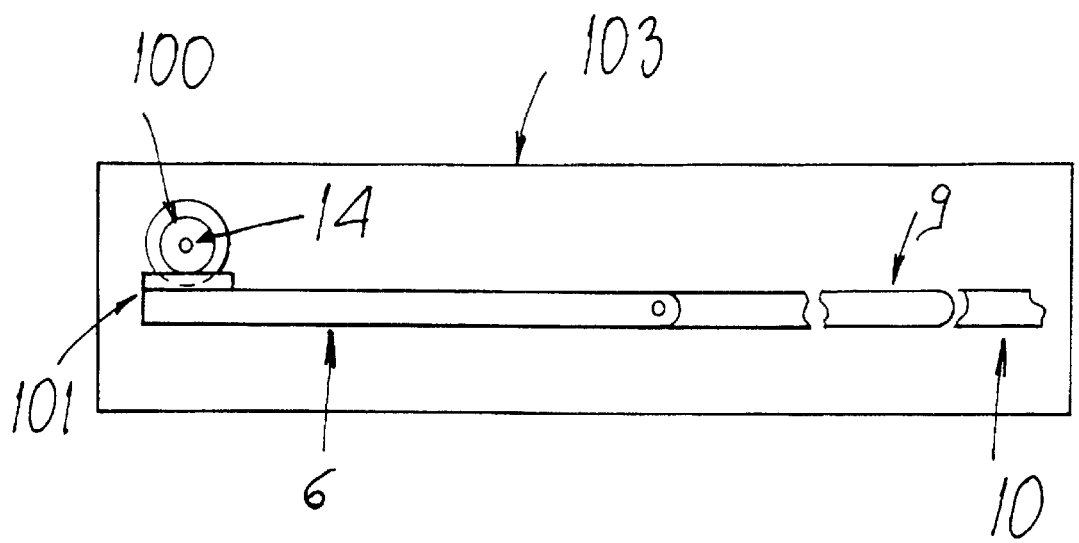
FIG. 6 is a schematic view of the actuation means utilised in the device of FIG. 2 for interruption operations.

An alternative embodiment of the actuation means for actuating the moving contact 9 inside the interruption unit 7 is described with reference to FIG. 6. A servomotor, not shown in the Figure, is operatively coupled to the moving contact 9 by means of a kinematic pair which comprises a pinion 100 which is mounted on the output of the actuation shaft 14. The pinion 100 is coupled to a rack 101 which is rigidly coupled to the guiding rod 6 of the moving contact 9, thus converting the rotary motion of the servomotor shaft into a translatory motion of the moving contact 9. As in the case of the connecting rod-crank system previously described, the fixed contact 10, the moving contact 9, the actuation rod 6, the pinion 100 and the rack 101 can be contained within a chamber 70 which is sealed with respect to the rest of the volume of the casing 4. The fixed contact 10 is electrically connected to the disconnection uni 24; an insulating partition 25 is positioned between the units 7 and 24; further, the disconnection unit 24 can be separated from the bushing 33 by means of the partition 34. At the base of the bushing 33 there is a transformer 35 which measures the current in output from the switchgear device.

The disconnection unit 24 comprises a first fixed contact 26 at ground potential, a second fixed contact 32 which is connected to the terminal 71, and a moving contact 27 which is guided by means of a rack system 28, which in turn is driven by an electric motor 29; advantageously, also the electric motor 29 is a motor with position control, preferably a servomotor and the kinematic pair for converting the rotary motion of the shaft of the servomotor 29 into a translatory motion of the moving contact is constituted by the rack system 28.

During the earth disconnection operation, the servomotor 29 moves the moving contact 27 toward the fixed contact 26, connecting the terminal 73 to the outer casing 4, which is at ground potential.

During the operation for disconnection on the bushing 33 side, the servomotor 29 moves the moving contact 27 toward the fixed contact 32, which is connected to the bushing 33.

An alternative embodiment of a gas-insulated device according to the invention, for a two-bar system, is described with reference to FIG. 2.

According to this embodiment, the switchgear device comprises a casing 4 which accommodates an interruption unit 7 and a disconnection unit 24; a first bushing 51, a second bushing 52 and a third bushing 53 are structurally connected to the casing 4 and house a first electrical terminal 73, a second electrical terminal 71, and a third electrical terminal 72. For example, the terminal 71 can be connected in input to the device with a main power line 1, and the terminals 72 and 73 can be connected in output from the device with the line 1 itself.

The disconnection unit 24 comprises a rotating shaft 62, preferably a camshaft 62 which is actuated by an actuation and control system 61 which, as described in FIG. 1, is preferably constituted by a servomotor 61. The camshaft 62 performs the operation for disconnection of a conductor 52, which is connected to the fixed contact 10 of the interruption unit 7, from the fixed contacts 55, 56 and 57, which are connected respectively to a point at ground potential, e.g. the outer casing 4, to the terminal 71 of the bushing 52 and to the terminal 72 of the bushing 53.

Disconnection occurs by moving the moving contact 58, 65 and 64 connected to the camshaft 62 by virtue of a system 59 which is constituted by a spring and a piston. With reference to the operation for opening and closing the disconnection contact 38, in case of closure the current flows from the conductor 54 to an enclosure 63 which surrounds the camshaft 62. From the enclosure 63, the current flows to the moving contact 58, driven by the camshaft 62, separates from the fixed contact 56, interrupting the electrical connection. The same kind of operation, both for opening and for closure, can occur for the moving contacts 64 and 65.

Clearly, the actuation means comprising the camshaft 62 and the system 59 can be utilised also in the device of FIG. 1.

The possible disconnection operations are shown schematically with reference to FIG. 3.

From an electrical point of view, the unit 24 can be represented by the three contacts 70, 71 and 72, which can connect the conductor 54, in output from the interruption unit 7, respectively to the output terminals 71 and 72 and to the outer casing 4, which is at ground potential.

The configurations that can be obtained by appropriately moving the camshaft 62 are:
a) contact 28 closed and contacts 65 and 64 open;
b) contact 65 closed and contacts 58 and 64 open;
c) contact 64 closed and contacts 65 and 58 open;
d) contacts 58 and 65 closed and contact 64 open.

Figure 2:
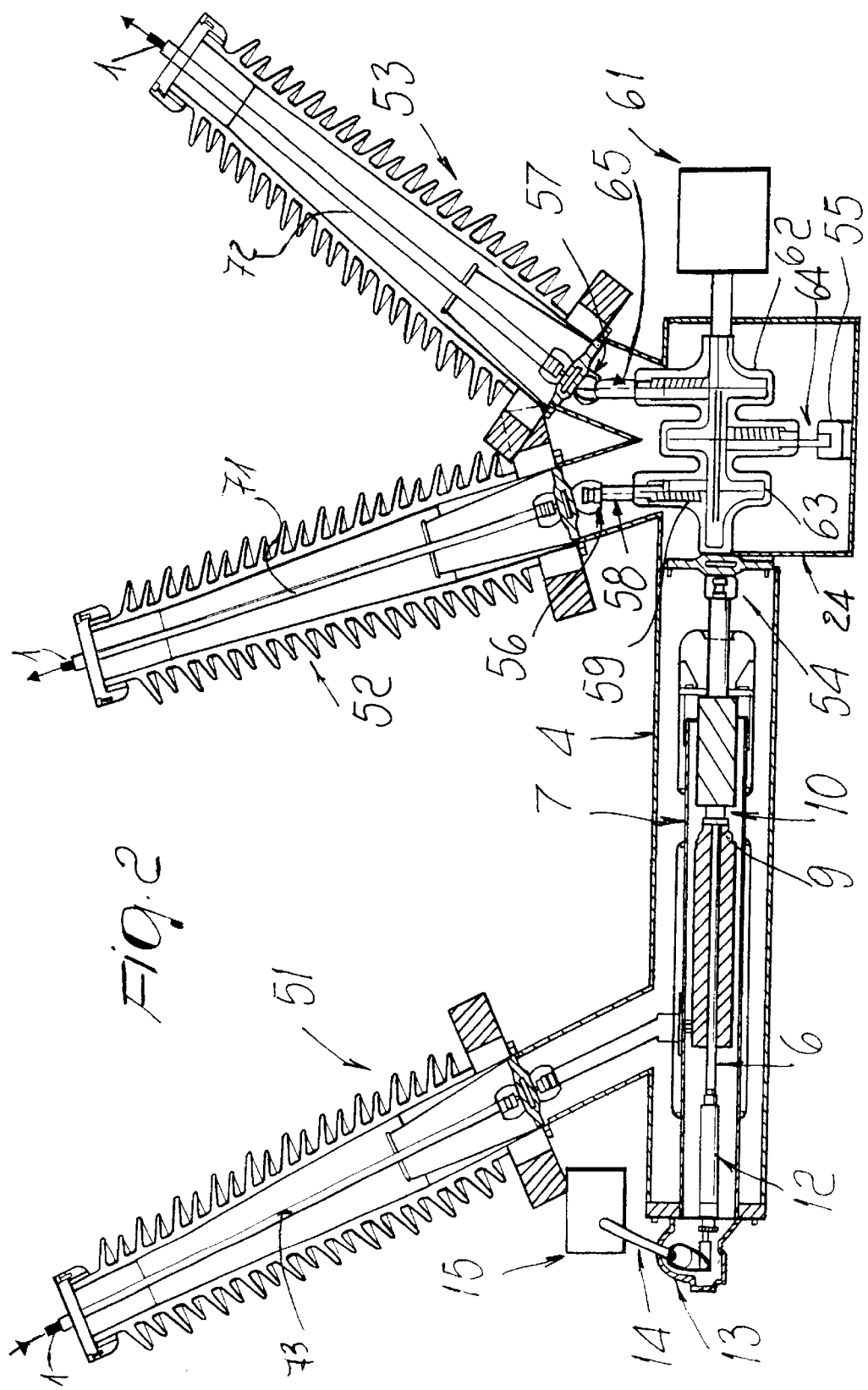
FIG. 2 is a view of a high- and medium-voltage gas-insulated switchgear device according to the invention for a two-bar system.

The embodiment of FIG. 2 is therefore particularly advantageous, since thanks to the position control allowed by the use of the servomotor, it is possible to perform disconnection, even on multiple terminals, simply by rotating the camshaft 62.

Thanks to the control over the rule of motion of the moving contacts and of the control of the angular position of the actuation shaft performed by the servomotor, the disconnection operations can be optimized both in terms of execution times and in terms of required energy consumption.

An alternative embodiment of the actuation means which actuate the moving contacts 58, 65 and 64 of FIG. 2 inside the disconnection chamber 24 is described with reference to FIG. 4.

The moving contact 58, is connected by means of a connecting rod 81 to a crank 82 which is connected to an actuations shaft 83 driven by a servomotor 61. During the closure operation of the disconnection unit, the actuation shaft 83 turns the crank 82 from the position 85 to the position 86, moving the moving contact 58 in the direction of the arrow 87.

During the opening operation of the disconnection unit, the actuation shaft 83 turns the crank 86 in the opposite direction, causing the movement of the moving contact 58 in the direction of the arrow 88. The kinematic pair constituted by the connecting rod-crank system can be arranged inside a conducting enclosure similar to the enclosure 63 of FIG. 2.

The same operation, both for opening and for closure, can occur for the moving contacts 64 and 65. According to this embodiment, in order to ensure the provision of all possible disconnection operations as described in FIG. 3, the actuation shaft 83 has a set of three connecting rod-crank kinematic pairs similar to the above-described one with reference to the moving contact 58, such pais being distributed with different relative angular positions with respect to the main axis of the shaft 83.

Another alternative embodiment of the kinematic pair that actuates the moving contacts 58, 64 and 65 of FIG. 2 inside the disconnection chamber 24 is illustrated with reference to FIG. 5.

An eccentric element 92 is connected to the main actuation shaft 91 which is connected to the servomotor 61. The actuation rod 90 of the moving contact 58 is connected to the connecting rod 93, which is connected to the eccentric element 92 by means of the roller 94, which can slide freely in a slot 95 formed proximate to the edge of the eccentric element 92. During the opening operation of the interruption unit, the servomotor 97 causes a rotation of the actuation shaft 91 in the direction of the arrow 96. Thanks to the presence of the roller 94 and of the eccentric element 92, the rotary motion of the shaft 91 is converted into a translatory motion of the guiding rod 90 in the direction of the arrow 97. Likewise, by moving the shaft 91 in the direction of the arrow 98 it is possible to produce the translatory motion of the guiding rod 90 and therefore of the moving contact 58 in the direction of the arrow 99.

As in the embodiment described in FIG. 4, in order to be able to perform all the disconnection operations described in FIG. 3, the actuation shaft 91 has a set of three eccentric elements which are distributed with a suitable angular position with respect to the axis of the actuation shaft, depending on which moving contact is to be driven.

According to another embodiment not shown in figures, the moving contacts 58, 64 and 65 of FIG. 2 can be provided by means of blades which are keyed with appropriate angles to the shaft driven by the servomotor. By appropriately turning the shaft of the servomotor it is possible to perform the operations described in FIG. 3.

The device according to the invention is particularly suitable for realizing mutlipole switchgear devices, e.g. for the connection to a multi-phase electrical line. In particular, a gas-insulated switchgear device with a three-pole disconnection actuation device, using a single actuation and control system for the disconnection operation of all the poles, is now schematically described with reference to FIG. 7. Said device comprises a single servomotor 124 which is coupled to the moving contacts that perform the operation for disconnection of the electric poles 120, 121 and 122 by means of a single actuation shaft 123 and by adopting suitable kinematic pairs, some embodiments of which are presented hereinafter.

Likewise, a servomotor can be coupled by means of a single transmission shaft to the moving contacts that perform the interruption operation in the electric poles 120, 121 and 122; alternatively, a servomotor can be used for each interruption unit as previously described.

All the operations can be performed in a reduced time and in a controlled manner by means of the use of actuation and control systems which preferably comprise a servomotor.

Figure 7:
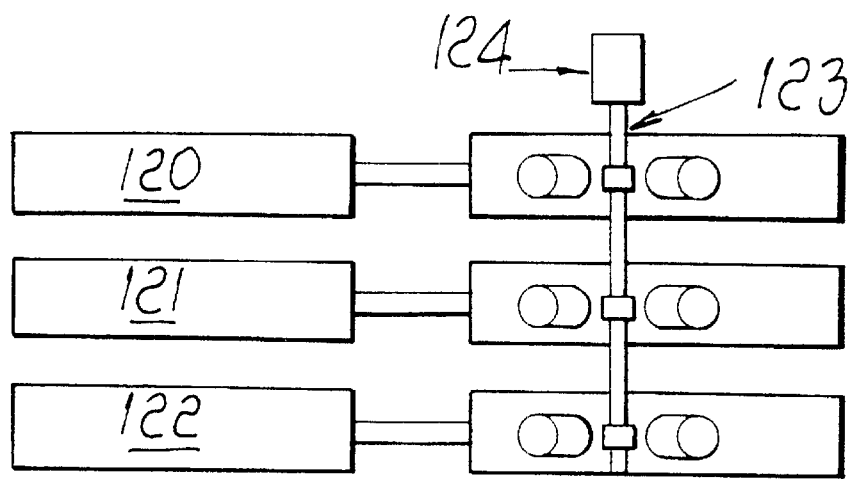
FIG. 7 is a schematic view of a multi-pole gas-insulated switchgear device with a single actuation device for performing disconnection operations.

An embodiment of the actuation means used for the disconnection operation in the device of FIG. 7 is presented with reference to FIG. 8.

For each individual pole, the actuation shaft 123 is coupled to a cam 130. The servomotor turns the actuation shaft 123, which drives the cam 130, making it perform angular movements through a controlled angle and with considerable precision. During the various steps of the operation, current flows from the sliding contact 131 (connected to the conductor 54 that arrives from the interruption unit) to the cam 130, which is covered with a conducting layer 111, and from there to one or more of the moving contacts 58, 65 and 64 which are coupled to the fixed contacts 56, 57 and 55 respectively connected to the terminals 71 and 72 and to the casing 4. Each moving contact can be moved by the cam 130 by means of a system 135 which is constituted for example by a spring-piston associated to the contact itself.

The possible steps of the disconnection operation are illustrated with reference to FIGS. 9a–9e. For the sake of simplicity, the reference numerals 136, 137 and 138 designate pair of electrical contacts 58–56, 65–57 and 64–55 respectively. By actuating the cam 130 e.g. in the direction of the arrow 139, the steps of the disconnection operation are:

1) contacts 136 closed, contacts 137 and 138 open (FIG. 9a);
2) contacts 136 and 137 closed, contacts 138 open (FIG. 9b);
3) contacts 137 closed, contact 136 and 138 open (FIG. 9c);
4) contacts 136, 137 and 138 open (FIG. 9d);
5) contacts 138 closed, contacts 137 and 136 open (FIG. 9e).

The order of the operation steps can be changed according to the requirements by appropriately actuating the shaft 123.

This solution is particularly advantageous because it allows to perform, with a single servomotor, the disconnection operations in all the poles of the gas-insulated device. This allows a considerable reduction in bulk.

Another embodiment of the actuation means used for the disconnection operation in the device of FIG. 7 is presented with reference to FIG. 10.

For each pole, the actuation shaft 123 is coupled to a pinion 145 which in turn is coupled to a rack 140. The rack 140 is rigidly connected to a slider 141 on the surface of which a cam 142 is provided. The slider 141 and the cam 142 are covered by a conducting layer. In this manner, current flows from the sliding contact 143, connected to the conductor 54 that arrives from the interruption chamber, to one or more of the moving contacts 58, 65 and 64. Each one of the moving contacts is provided with a spring-piston system which ensures coupling between the contact and the cam 142. The contact 64, which provides the connection to the casing of the gas-insulated device, is arranged horizontally in the direction of the arrow 146. This allows a considerable reduction in bulk.

Figure 11A:
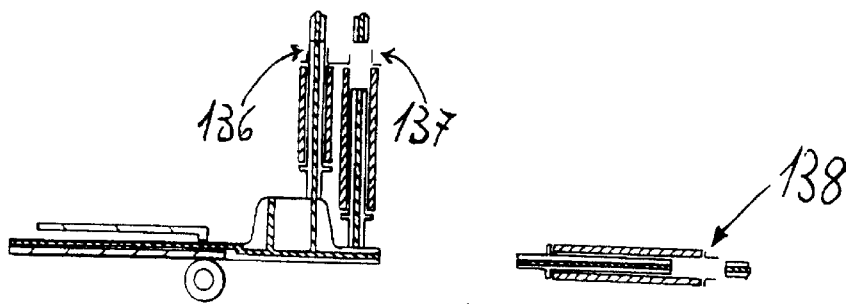
FIGS. 11a–11e are schematic views of the disconnection operations that can be performed with the actuation system of FIG. 10.
Figure 11B:
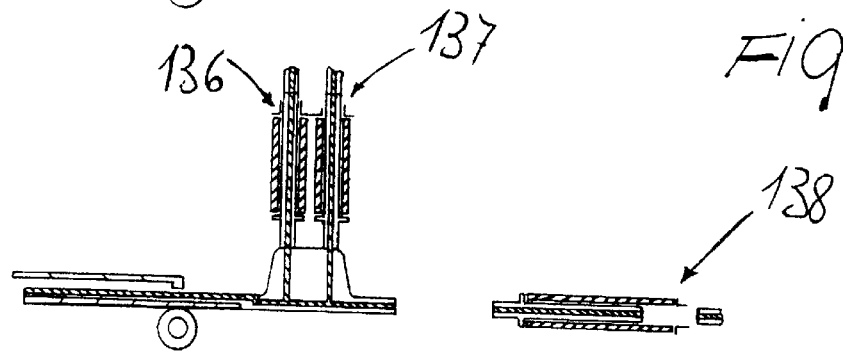
Figure 11C:
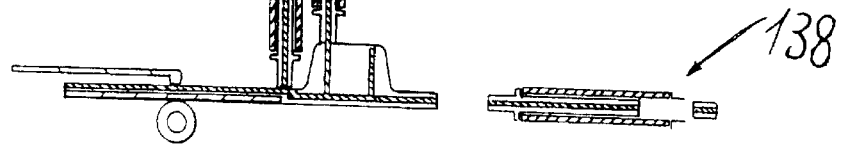
Figure 11D:
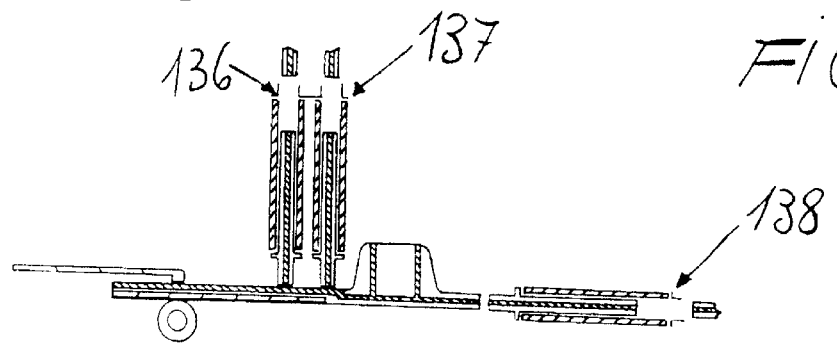
Figure 11E:
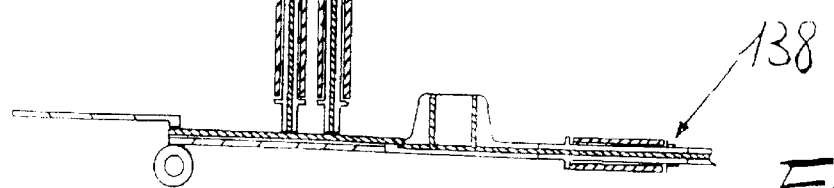
Figure 12:
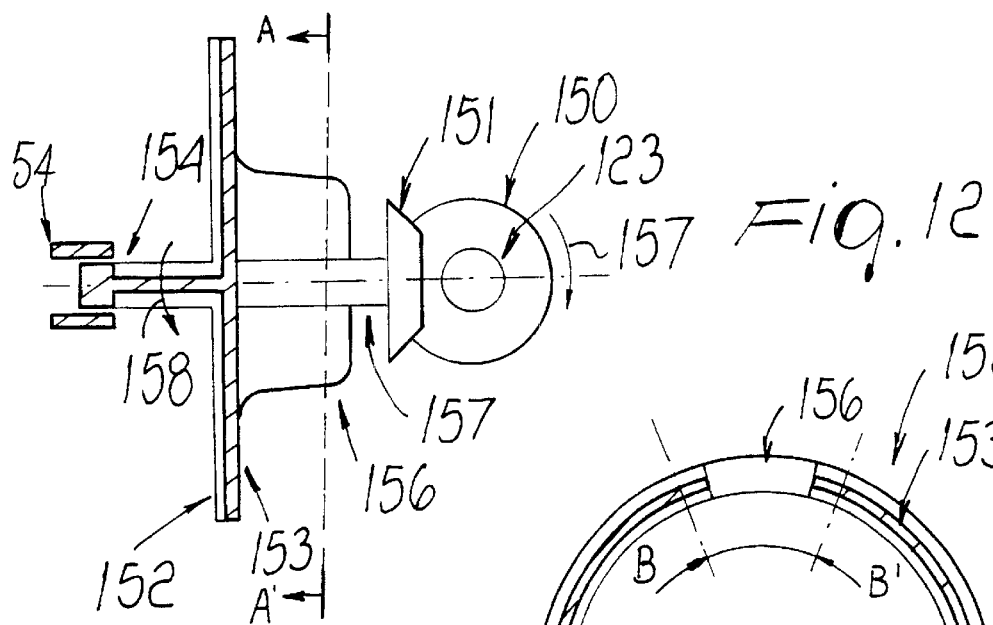
FIG. 12 is a schematic view of a further embodiment of an actuation system utilised in the gas-insulated device of FIG. 7.
Figure 13:
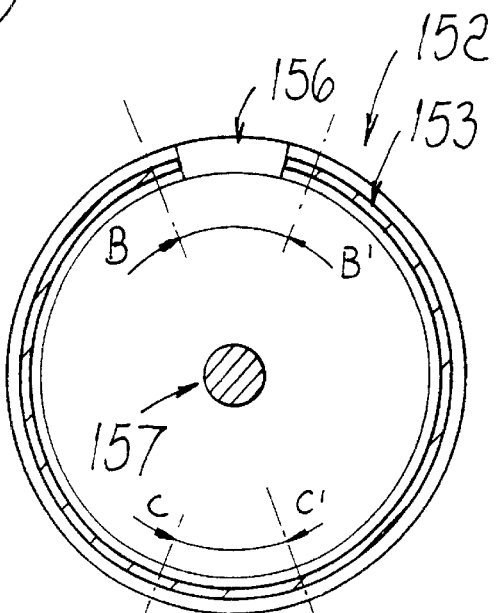
FIG. 13 is a sectional view; taken along the plane AA' of FIG. 12.
Figure 14:
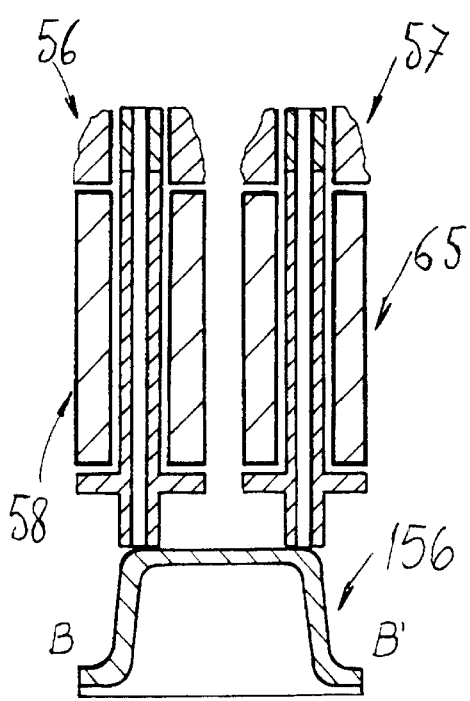
FIG. 14 is a sectional view taken along the plane BB' of FIG. 13.
Figure 15:
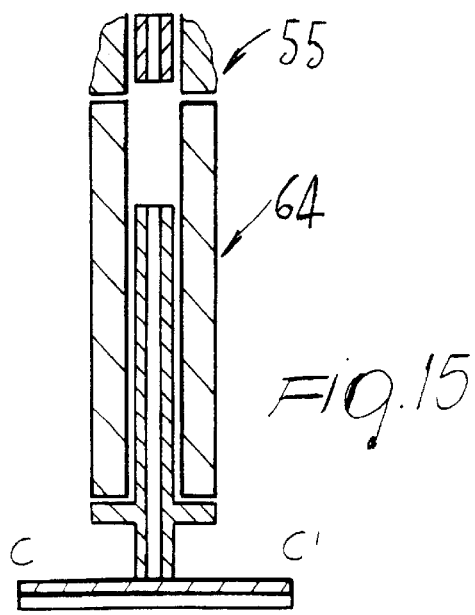
FIG. 15 is a sectional view taken along the plane CC' of FIG. 13.

With reference to FIGS. 11a–11e, the possible steps of the disconnection operation are illustrated. For the sake of simplicity, the reference numerals 136, 137 and 138 designate pair of electrical contacts 58–66, 65–67 and 64–55 respectively. By turning the actuation shaft in the direction indicated by the arrow 148 of FIG. 10, causing the consequent movement of the slider in the direction of the arrow 146, the steps of the disconnection operation are:

1) contacts 136 closed, contacts 137 and 138 open (FIG. 11a);
2) contacts 136 and 137 closed, contacts 138 open (FIG. 11b);
3) contacts 137 closed, contacts 136 and 138 open (FIG. 11c);
4) contacts 136, 137 and 138 open (FIG. 11d);
5) contacts 138 closed, contacts 137 and 136 open (FIG. 11e).

The order of the operation steps can be changed according to the requirements by appropriately actuating the shaft 123.

A further embodiment of the actuation means used for the disconnection operation in the device of FIG. 7 is presented with reference to FIGS. 12, 13, 14 and 15.

With reference to FIGS. 12–15, for each one of the poles of the device, the actuation shaft 123 is connected to a bevel gear 150 which is connected to another bevel gear 151 which is rigidly coupled, by means of the secondary shaft 157, to the disk 152. A cam 156 is formed on the surface of the disk 153. A rotation of the actuation shaft 123, e.g. in the direction of the arrow 157, produces, through the coupling of the bevel gears 150 and 151, a rotation of the disk 152 in the direction of the arrow 158. Accordingly, the cam 156 rotates, moving the moving contacts 58, 65 and 64. Since they are provided with a spring and piston system, the moving contacts 58, 65 and 64 make contact with the corresponding fixed contacts 56, 57 and 55, which are respectively connected to the terminals 71 and 72 and to the casing 4. Current flows through the sliding contact 154 from the conductor 54, connected to the interruption unit 7, to the moving contacts 58, 65 and 64 by means of the cam 156 and the conducting layer 153. The moving contacts are arranged in a horizontal position with respect to the rotation axis of the disk 152. This solution allows to further reduce the bulk caused by the arrangement of the moving contacts.

Figure 16A:
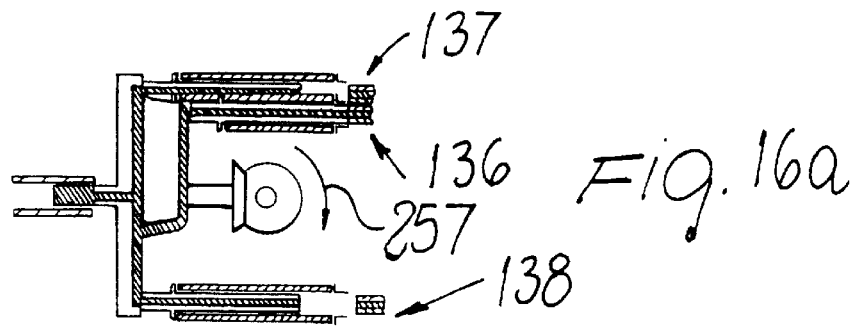
FIGS. 16a–16e are schematic views of the disconnection operations that can be performed with the actuation system of FIG. 12.
Figure 16B:
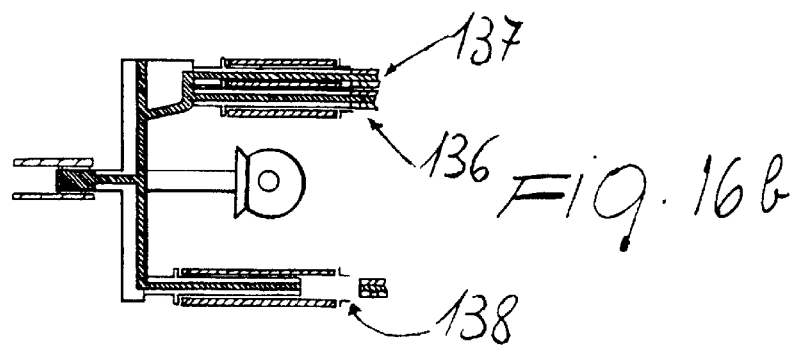
Figure 16C:
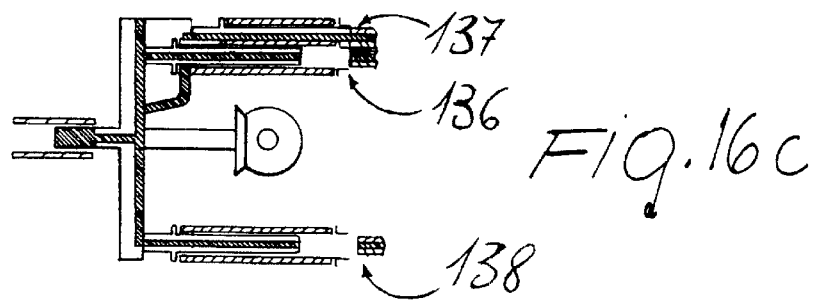
Figure 16D:
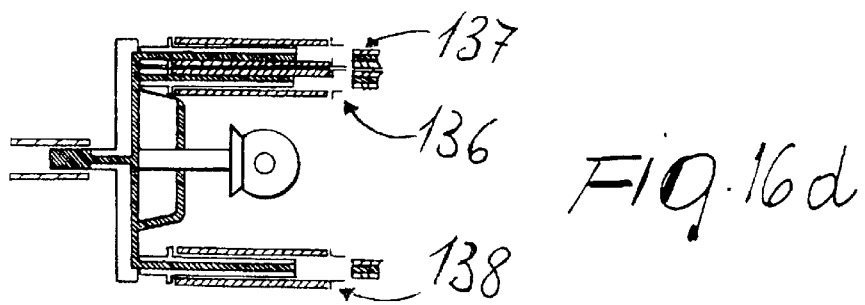
Figure 16E:
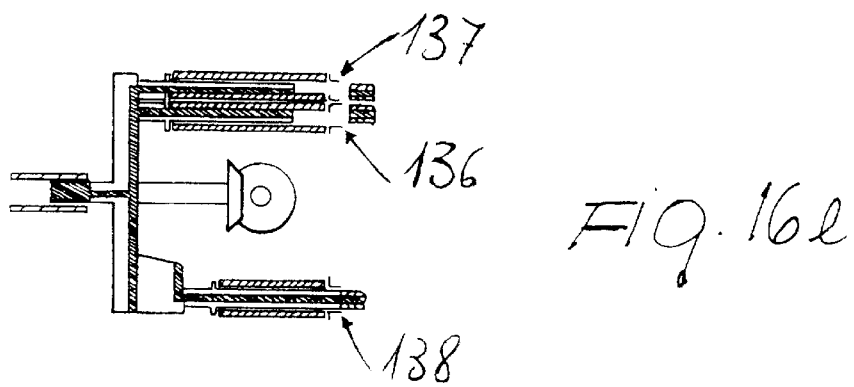

With reference to FIGS. 16a–16e the possible steps of the disconnection operation are illustrated. For the sake of simplicity, the reference numerals 136, 137 and 138 designate pair of electrical contacts 58–56, 65–57 and 64–55 respectively. By turning for example the actuation shaft in the direction of the arrow 257 the steps of the disconnection operation are:

1) contacts 136 closed, contacts 137 and 138 open (FIG. 16*a*);
2) contacts 136 and 137 closed, contacts 138 open (FIG. 16*b*);
3) contacts 137 closed, contacts 136 and 138 open (FIG. 16*c*);
4) contacts 136, 137 and 138 open (FIG. 16*d*);
5) contacts 138 closed, contacts 137 and 136 open (FIG. 16*e*).

The order of the operation steps can be changed according to the requirements by appropriately actuating the shaft 123.

Clearly, the various embodiments of the actuation means described with reference to the three-pole device of FIG. 7 can be used in an equivalent manner in the devices of FIGS. 1 and 2.

The device according to the invention is particularly suitable for use in an electrical substation. Accordingly, the present invention also relates to a high- and/or medium-voltage electric power distribution and transmission substation characterized in that it comprises a switchgear device according to the invention.

The gas-insulated switchgear device thus conceived is susceptible of modifications and variations, all of which are within the scope of the inventive concept, all the details may further be replaced with other technically equivalent elements. In practice, the materials, so long as they are compatible with the specific use, as well as the individual components, may be any according to the requirements and the state of the art.

What is claimed is:

1. A high- and medium-voltage gas-insulated switchgear device, characterized in that it comprises a casing which contains:
    at least an interruption unit having at least one fixed contact and one moving contact which can couple each other, and first actuation means which are operatively connected to the moving contact;
    at least a disconnection unit electrically connected to the interruption unit, said disconnection unit having at least one fixed contact and one moving contact which can couple each other, and second actuation means which are operatively connected to the moving contact;
    and in that at least one of said actuation means comprises a motor with position control, wherein the interruption unit comprises a sealed casing, the interruption unit being extractable with respect to remaining parts of the switchgear device.

2. The switchgear device according to claim 1, characterized in that said first actuation means comprise a motor with position control.

3. The switchgear device according to claim 1, characterized in that said second actuation means comprise a motor with position control.

4. The switchgear device according to claim 2, characterized in that said motor with position control is a rotary servomotor which is operatively connected to the moving contact of the interruption unit by means of a kinematic pair, said kinematic pair converting the rotary motion of the shaft of the servomotor into a translatory motion of the moving contact.

5. The switchgear device according to claim 4, characterized in that said kinematic pair comprises a crank rigidly coupled to a main actuation shaft which is connected to the servomotor, and a connecting rod which is connected to the crank and to a guiding rod of the moving contact.

6. The switchgear device according to claim 4, characterized in that said kinematic pair comprises a pinion coupled to a main actuation shaft which is connected to the servomotor, and a rack which is coupled to the pinion and to a guiding rod of the moving contact.

7. The switchgear device according to claim 3, characterized in that said motor with position control is a rotary servomotor which is operatively connected to the moving contact of the disconnection unit by means of a kinematic pair, said kinematic pair converting the rotary motion of the shaft of the servomotor into a translatory motion of the moving contact.

8. The switchgear device according to claim 7, characterized in that said kinematic pair comprises a camshaft which is connected to the shaft of said servomotor each cam of said camshaft being coupled to a moving contact by means of a spring associated thereto.

9. The switchgear according to claim 7, characterized in that said kinematic pair comprises a crank rigidly coupled to a main actuation shaft which is connected to the servomotor, and a connecting rod which is connected to the crank and to a guiding rod of the moving contact.

10. The switchgear device according to claim 7, characterized in that said kinematic pair comprises at least one eccentric element which is rigidly coupled to a main actuation shaft which is connected to the servomotor, and a connecting rod which is connected to said eccentric element and to a guiding rod of the moving contact.

11. The switchgear device according to claim 3, characterized in that said motor with position control is a rotary servomotor which is operatively connected to the moving contact of the disconnection unit by means of a rack system.

12. A multi-pole gas-insulated switchgear device, characterized in that it comprises at least a containing casing inside which there are placed, for each pole:
    at least an interruption unit having at least one fixed contact and one moving contact which can couple each other, and first actuation means which are operatively connected to said moving contact;
    at least a disconnection unit electrically connected to the interruption unit, said disconnection unit having at least one fixed contact and one moving contact which can couple each other, and second actuation means which are operatively connected to said moving contact;
    and in that the actuation means of the disconnection unit comprise a single motor with position control, wherein the interruption unit comprises a sealed casing, the interruption unit being extractable from the switchgear device.

13. The multi-pole gas-insulated switchgear device according to claim 12 characterized in that said motor with position control is a rotary servomotor.

14. The multi-pole gas-insulated switchgear device according to claim 13, characterized in that said servomotor is operatively connected to the moving contact of the disconnection units by means of a cam which is keyed to the main actuation shaft of the servomotor, and of a spring coupled to the cam and to a moving contact.

15. The multi-pole gas-insulated switchgear device according to claim 13, characterized in that said servomotor is operatively connected to the moving contact of the disconnection units by means of a pinion connected to a shaft actuated by the servomotor, said pinion being coupled to a rack connected to a slider which comprises a cam coupled at least to one moving contact by means of a spring-piston system.

16. The multi-pole gas-insulated switchgear device according to claim 13, characterized in that said servomotor is operatively connected to the moving contact of the disconnection units by means of a first gear which is keyed to the main actuation shaft of the servomotor, and of a second gear connected to the first gear and to a disk which comprises a cam coupled at least to one moving contact by means of a spring-piston system.

17. A high- and/or medium-voltage electric power distribution and transmission substation characterized in that it comprises a switchgear device according to one or more of the preceding claims.

* * * * *

UNITED STATES PATENT AND TRADEMARK OFFICE
CERTIFICATE OF CORRECTION

PATENT NO. : 6,545,241 B1
DATED : April 8, 2003
INVENTOR(S) : Franchi et al.

It is certified that error appears in the above-identified patent and that said Letters Patent is hereby corrected as shown below:

<u>Title page,</u>
Item [22], should read:
-- [22] PCT Filed: Oct. 18, 1999 --
Item [86], should read:
-- [86]  PCT No.: PCT/EP99/07914

§ 371 (c)(1),
(2), (4) Date: May 8, 2001 --

Signed and Sealed this

Twenty-sixth Day of August, 2003

JAMES E. ROGAN
*Director of the United States Patent and Trademark Office*